United States Patent [19]

Nakajima et al.

[11] Patent Number: 4,857,951
[45] Date of Patent: Aug. 15, 1989

[54] OUTPUT DEVICE FOR RANGE INFORMATION FOR USE IN AN INTERCHANGEABLE LENS

[75] Inventors: Yukio Nakajima, Kanagawa; Tetsuo Miyasaka; Sumio Kawai, both of Hachioji, all of Japan

[73] Assignee: Olympus Optical Co., Ltd., Japan

[21] Appl. No.: 852,140

[22] Filed: Apr. 15, 1986

[30] Foreign Application Priority Data

Jun. 20, 1985 [JP] Japan .................. 60-134800

[51] Int. Cl.⁴ .................. G03B 3/00; G03B 15/05; G03B 17/18
[52] U.S. Cl. .................. 354/400; 354/412; 354/421; 354/195.1; 354/195.13; 354/289.1
[58] Field of Search .............. 354/400, 401, 402, 286, 354/195.1, 195.13, 418, 421, 412, 132, 145.1, 289.1, 62, 106, 415, 195.12, 413

[56] References Cited

U.S. PATENT DOCUMENTS

| | | | |
|---|---|---|---|
| 4,021,824 | 5/1977 | Uehiyama et al. | 354/418 |
| 4,343,300 | 8/1982 | Hattori | 354/62 |
| 4,348,089 | 9/1982 | Shenk | 354/400 X |
| 4,361,388 | 11/1982 | Mlcak et al. | 354/106 |
| 4,477,164 | 10/1984 | Nakai et al. | 354/412 X |
| 4,508,443 | 4/1985 | Matsuzaki et al. | 354/195.1 X |
| 4,509,842 | 4/1985 | Taniguchi et al. | 354/286 X |
| 4,541,700 | 9/1985 | Bletz et al. | 354/286 |
| 4,547,057 | 10/1985 | Kataoka | 354/415 |
| 4,554,674 | 11/1985 | Sakai et al. | 354/400 |
| 4,573,786 | 3/1986 | Taniguchi et al. | 354/145.1 |
| 4,687,308 | 8/1987 | Someya | 354/289.1 X |
| 4,695,148 | 9/1987 | Terui et al. | 354/145.1 |
| 4,712,902 | 12/1987 | Hosomizu et al. | 354/421 X |
| 4,724,456 | 2/1988 | Ishimura et al. | 354/286 X |
| 4,743,931 | 5/1988 | Matsuzaki et al. | 354/400 |

FOREIGN PATENT DOCUMENTS

| | | |
|---|---|---|
| 59-123822 | 7/1984 | Japan . |
| 168407 | 9/1984 | Japan .................. 354/402 |

Primary Examiner—W. B. Perkey
Attorney, Agent, or Firm—Ostrolenk, Faber, Gerb & Soffen

[57] ABSTRACT

An output device for range information for use in an interchangeable lens includes a range ring of the interchangeable lens which is first preset at an extreme position, namely, a position at infinity or at close range, and a CPU disposed in the interchangeable lens for producing absolute range information relative to the extreme position on the basis of pulses which are generated in response to data stored in the CPU and rotating of the range ring. A camera system includes rotatable and manually operable operating members which are located on a camera accessory. Rotation of the operating members results in the generation of pulses and the rotation detection device uses the pulses for detecting rotation of the operating members. An output from the detecting means serves to control a motor drive to focus an interchangeable lens.

42 Claims, 9 Drawing Sheets

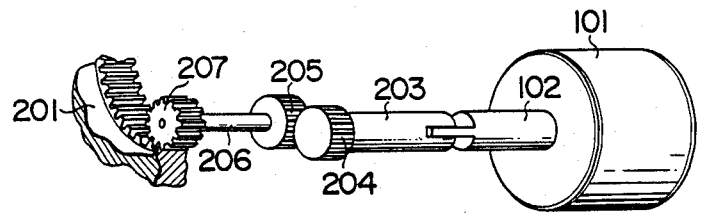
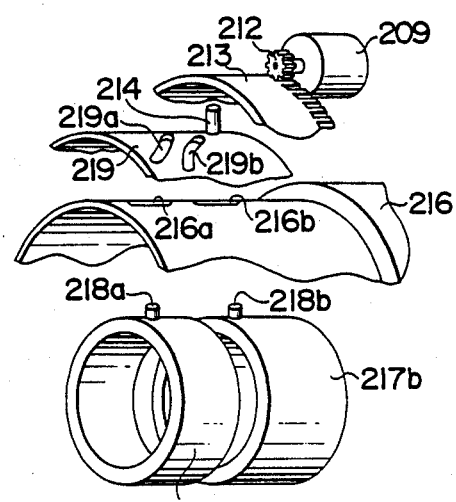
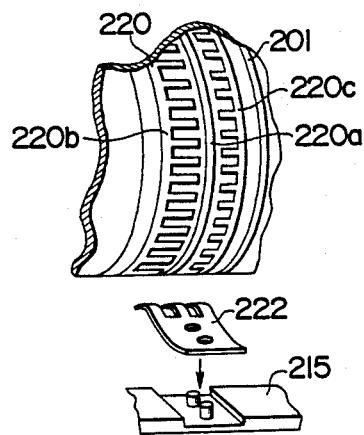

OUTPUT DEVICE FOR RANGE INFORMATION FOR USE IN AN INTERCHANGEABLE LENS

BACKGROUND OF THE INVENTION

The present invention relates to a single lens reflex camera, and more particularly, to an output device for range information for use in an interchangeable lens adapted to be detachably mounted on a camera.

In a single lens reflex camera, range information is required for effecting an automatic focussing operation. A mechanical transfer device has been widely utilized in the past to obtain range information from the lens side. However, such device has the disadvantage of being large-sized, complicated and inaccurate. A a result, an arrangement in which information signals are transmitted to a camera body has been proposed (Japanese Laid-Open Patent Publication Sho 54/1979-108628). The proposed arrangement, however, lacks the capability of expanding the scope of information since signals are limited to only that information which is transmitted from the lens side and a prescribed sequence for transmitting signals can not be varied. When it is desired to obtain information from a camera system other than a lens in the same way, a number of input lines are required, resulting in that the arrangement increases in size and becomes complicated.

In view of the foregoing, camera systems in which an arithmetic unit of a microcomputer (hereinafter referred to as a CPU) is separately disposed in each of the systems have been proposed by the assignee of the present invention (Japanese Laid-Open Patent Publication Sho 60/1985-26324). Even in this proposal, however, there is no practical solution to the problem of reading range information of an interchangeable lens and transmitting the range information to a camera body.

Outputs relating to range information of an interchangeable lens fall into two categories, absolute and relative range information. Absolute range information in an autofocussing operation is represented by an output of a signal corresponding to a range obtained by reading a rotation preset position of a range ring as shown in, for example, Japanese Laid-Open Patent Publication Sho 50/1975-67650. Relative range information refers to the amount by which a present position is away from a reference position. The use of relative range information, which can be produced only by a comblike electrode, for example, advantageously simplifies a construction of an output device for range information of an interchangeable lens. On the other hand, although absolute range information may be conveniently used in a single lens reflex camera serving as a system camera, it leads to a complicated structure and therefore is rarely used.

SUMMARY OF THE INVENTION

It is an object of the present invention to provide an output device for range information for use in an interchangeable lens which is simple in structure and produces an output of an electrical signal in a precise manner as absolute range information to a CPU disposed in a camera body and other attachments associated therewith.

According to the present invention, the focussing operation of higher accuracy can be achieved with both of a CPU provided on the side of a lens barrel and a detector for delecting an amount of rotation, and range information of the lens can be obtained in the form of information from the rotation detector, which can be also used for a system other than the lens, such as in a flashmatic control of an electronic flash unit or a strobo unit.

Transfer of electrical signals between a lens barrel and camera body is effected through bus lines, so that a time sharing processing with signal transfer to other systems can be performed, resulting in a miniaturized device.

In addition, since absolute range information of an interchangeable lens can be produced only by a comblike electrode of a simple structure, it may be only necessary to read the absolute range information from the electrode without coding it and it is possible to accurately deliver the absolute range information to a CPU provided in a camera body, resulting in a reduction in the numbers of terminals for input and output of an electric circuitry for dealing with the absolute range information.

A further camera system embodiment according to the present invention comprises: rotatable and manually operable operating members disposed on a camera accessory; pulse generating means for generating pulses in response to rotation of said operating member; rotation detection means for detecting rotation of said operating members on the basis of said pulses received from said pulse generating means; and a motor drive control circuit for focussing an interchangeable lens in response to an output of said detecting means.

BRIEF DESCRIPTION OF THE DRAWINGS

FIG. 3 is a perspective view of a range ring drive device of the lens barrel shown in FIG. 2;

FIG. 4 is a perspective view of a focal length change drive device of the lens barrel shown in FIG. 2;

FIG. 5 is a perspective view illustrating a structure of a comblike electrode of the lens barrel shown in FIG. 2;

DETAILED DESCRIPTION OF THE PREFERRED EMBODIMENTS

Figure 1:
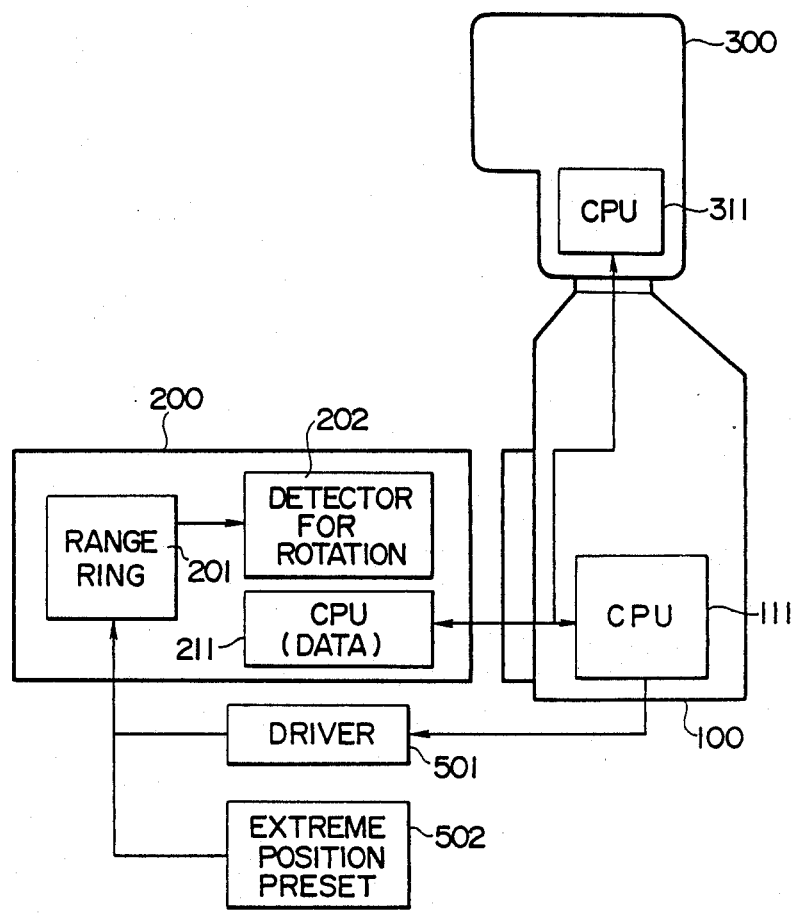
FIG. 1 is a schematic diagram of the overall concept of the present invention.

Referring to FIG. 1, an output device for range information of an interchangeable lens according to the present invention has a basic arrangement in which a range ring 201 of the interchangeable lens is rotated to an extreme position, that is, a position at infinity or at close range by an extreme position preset means 502 which is disposed within a camera body 100 or an interchangeable lens barrel 200 substantially at the same time that the lens barrel 200 is mounted on the camera body 100 or a power switch not shown on the camera body 100 is turned on, to obtain a range information based on a rotational angle of the range ring 201 from the extreme position. Specifically, the lens barrel 200 comprises a rotation detector 202 for producing pulses corresponding to a rotational angle of the range ring 201 and a CPU 211 which is an arithmetic unit of a microcomputer containing data necessary for control of focussing individual interchangeable lenses, as part of a program. The CPU 211, after the range ring 201 has been set to the position at infinity or close range which is a reference position of the range ring 201, delivers an output which provides absolute range information for the range ring 201 which is calculated by the data contained in the CPU 211 and the pulses from the detector 202 to a CPU 111 disposed within the camera body 100, thereby a range being set by a drive means 501 provided within the lens barrel 200 or the camera body 100.

A preferred embodiment of the present invention will be described hereinafter with reference to FIGS. 2 through 15.

Figure 2:
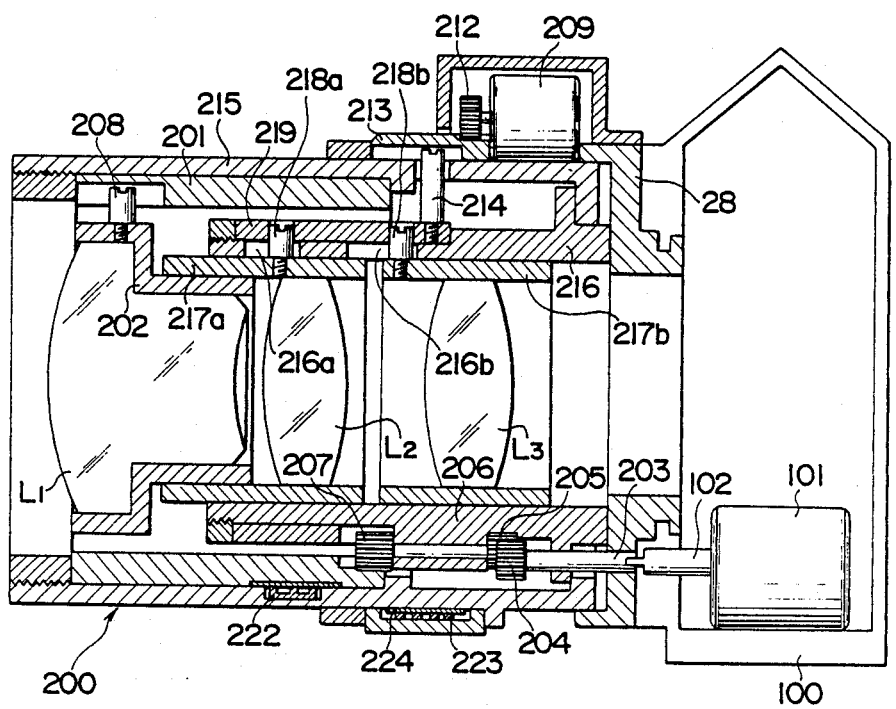
FIG. 2 is a sectional view of an interchangeable lens barrel to which the present invention is applied.

FIG. 2 is a sectional view of an interchangeable lens barrel 200 to which an output device for outputting range information obtained from an interchangeable lens according to the present invention is applied. The interchangeable lens, which is a zoom lens, comprises a focussing lens $L_1$ and lenses $L_2$ and $L_3$ which are movable for obtaining zooming operation. The focussing operation is effected by transmitting the drive force of a lens drive motor 101 provided within the camera body 100 through a coupler to the lens barrel 200 in a camera mount 28. Details of the transmitting mechanism are shown in FIG. 3. An output shaft 102 of the motor 101 constitutes part of the coupler which engages one end of a shaft 203 provided on the side of the lens barrel 200. The drive force of the motor 101 is transmitted to the range ring 201 through a gear 204 which is fixed to the other end of the shaft 203 and a gear 205 which meshes with the gear 204, further through a pinion 207 which is provided on the end of a shaft 206 of the gear 205 and a rack which is provided on the inner periphery of the range ring 201 so as to mesh with the pinion 207, to move the focussing lens $L_1$ by rotating the range ring 201 and urging a pin 208 which is provided on a holding frame 202 of the lens $L_1$.

The zooming operation is effected by a drive force of a motor 209 which is disposed within the lens barrel 200. As seen in FIG. 4, a rack is provided on the outer periphery of a zoom ring 213 which rack meshes with a pinion 212 provided on an output shaft of the motor 209. A groove is provided on the inner periphery of the zoom ring 213 which groove engages a pin 214 provided on a cam ring 219. The cam ring 219 has cam holes 219a, 219b which allow the lenses $L_2$, $L_3$ to move in a given relationship with each other. The lenses $L_2$, $L_3$ have respective holding frames 217a, 217b on which respective pins 218a, 218b are provided. These pins 218a, 218b engage the cam holes 219a, 219b of the cam ring 219 through linear groove holes 216a, 216b which are formed in the direction of optical axis of an inner fixed barrel 216, respectively. With such arrangement, when a drive force of the motor 209 is transmitted to the zoom ring 213, the cam ring 219 turns and the holding frames 217a, 217b, in turn, move in the direction of the optical axis to perform the zooming operation.

The range ring 201 has a comblike electrode 220 as shown in FIG. 5. The electrode 220 comprises a grounding conductor 220a which is formed in the form of a band along the outer periphery of the range ring 201 and comblike conductors 220b, 220c which are formed respectively on the opposite sides of the grounding conductor 220a. Each of the conductors 220a, 220b, 220c are electrically in contact with respective conducting pieces of a contact 222 which is provided on a portion of an outer fixed barrel 215 which portion is on the opposite side of the electrode 220. The comblike electrodes of the conductors 220b, 220c are shifted with respect to each other by half a pitch. The contact 222 is fixedly secured in a recess provided on the inner periphery of the outer fixed barrel 215 with two pins on the barrel 215 inserted into two pin holes of the contact 222 in such a manner that the contrast 222 is slidably in abutment against the comblike electrode 220 provided on an outer peripheral portion of the range ring 201 which portion is lower than the outer surface thereof during rotation of the range ring 201.

Figure 8:
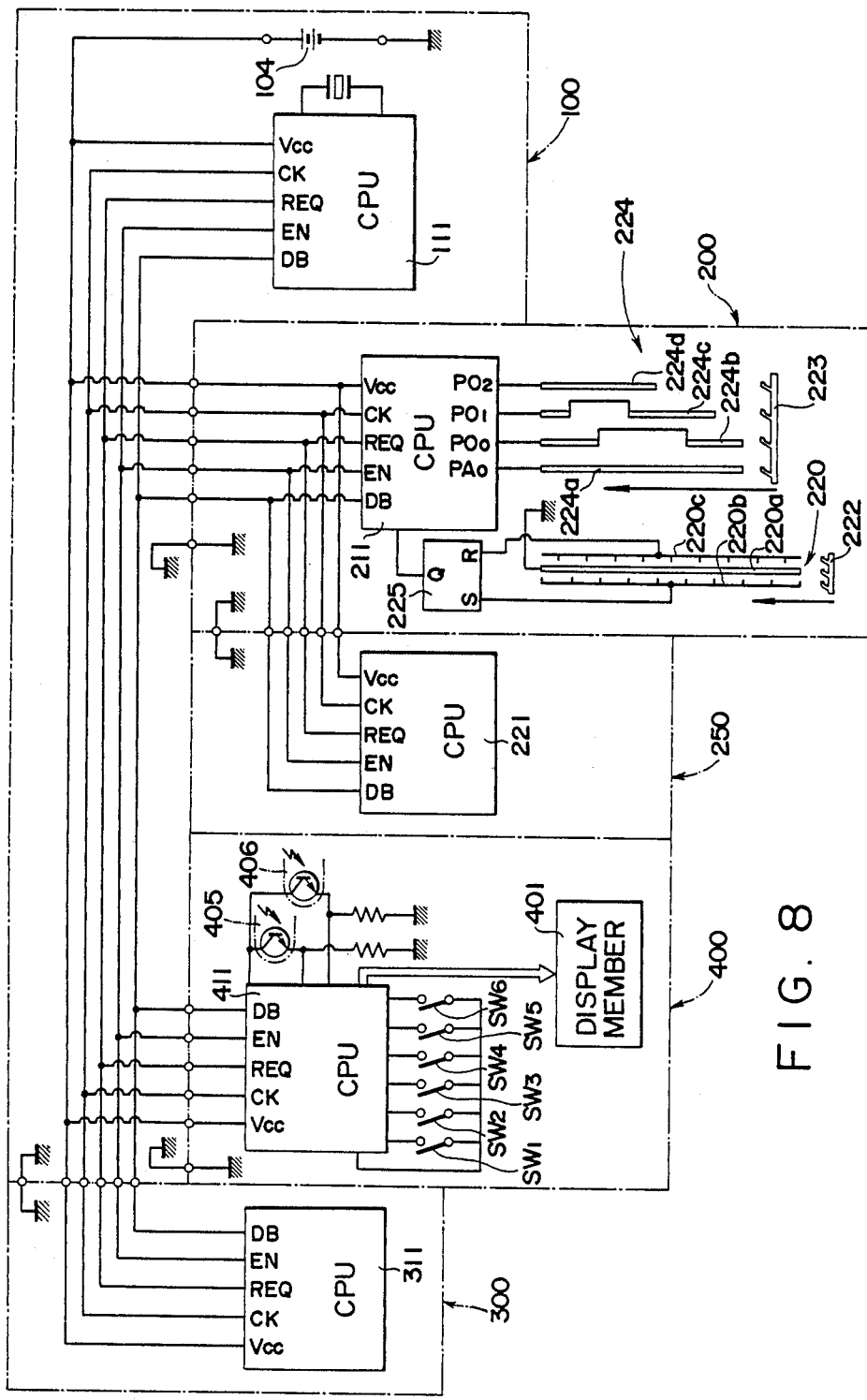
FIG. 8 is a circuit of a device according to the present invention.

As shown in FIG. 8, the comblike conductor 220b is connected to a set input terminal S of an R-S flipflop 225 (hereinafter referred to as RS-FF) and the comblike conductor 220c is connected to a reset input terminal R thereof. During rotation of the range ring 201 the contact 222 alternately comes into abutment with the conductors 220b, 220c so that the input terminals S, R of the RS-FF 225 are alternately grounded to deliver the number of pulses corresponding to the rotational angle of the range ring 201 from an output terminal Q of the RS-FF 225 to a CPU 211. The arrangement of providing two conductors 220b, 220c to connect them to respective input terminals S, R of the RS-FF 225 is used to prevent chattering. Or bouncing off other electrical measures are provided for preventing chattering in the CPU 211, it is not necessary to provide the above arrangement. For example, it is possible to employ a one-shot pulse generator in place of the RS-FF 225, eliminating one of the conductors 220b, 220c.

Figure 6:
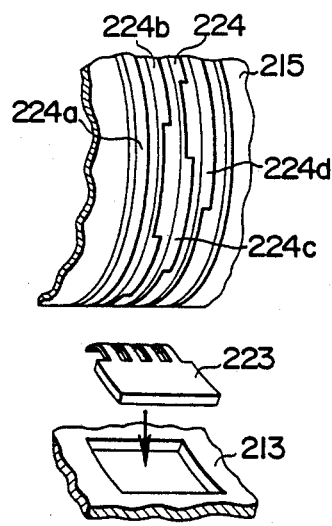
FIG. 6 is a perspective view illustrating a structure of a slide electrode of the lens barrel shown in FIG. 2.
Figure 9:
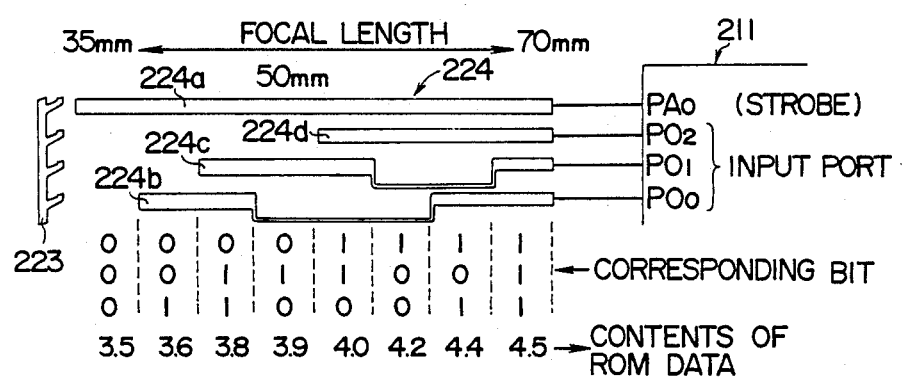
FIG. 9 is a schematic diagram illustrating of a gray scale comprised of a slide terminal and a contact piece which are shown in FIG. 6.

In FIG. 6, a slide terminal 224 comprising four bandlike conductors 224a to 224d in the gray code pattern is provided on the outer periphery of the outer fixed barrel 215 and a contact piece 223 is fixedly provided at a position in face of the slide terminal 224 in a recess of the zoom ring 213 in such a manner that the slide contact 224 and the contact piece 223 are electrically in contact with each other. Accordingly, during rotation of the zoom ring 213 the slide terminal 224 and the contact piece 223 serve as a zoom encoder which produces gray-coded signals of four bits. The conductors 224a to 224d are connected to ports $PA_0$, $PO_0$, $PO_1$, $PO_2$ of the CPU 211, respectively (FIGS. 8, 9).

A single lens reflex camera can be systematized as a system camera by combining various attachments such as an interchangeable lens group, a motor drive unit and a strobo unit with a camera body so as to provide various functions. In the present invention, each of these attachments is separately provided with a respective CPU.

Figure 7A:
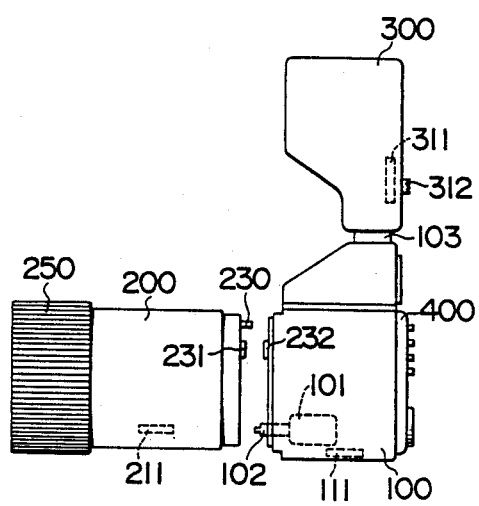
FIGS. 7A and 7B are a side and a rear view of a camera provided with an device of the present invention, respectively.
Figure 7B:
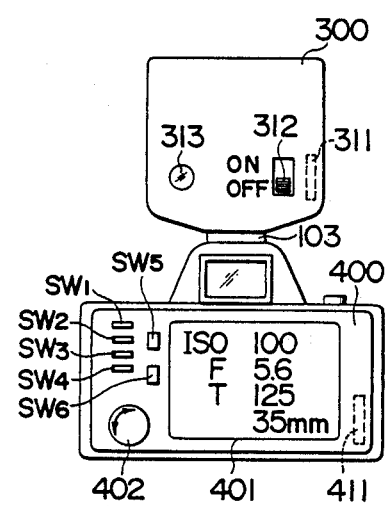

In FIGS. 7A and 7B, a camera body 100 includes a CPU 111 which is a main arithmetic unit and has a proper or address code 10 H (H designates hexadecimal notation). The CPU 111 operates signals from an autofocussing element not shown to deliver the result to a motor 101. A drive force of the motor 101 is transmitted through a mount coupler of an output shaft 102 and the mechanism shown in FIG. 3 to the range ring 201. A strobo unit 300 is mounted on a shoe 103 of camera body 100 and a control back 400 is mounted on the rear surface of the camera body 100.

CPU 211 is housed within an interchangeable lens barrel 200 and has an address code 20 H. A diaphragm lever 230 is operated by a diaphragm control not shown within the camera body 100 in a manner similar to a conventional camera. In addition, an electrical contact terminal 231 provided on the interchangeable lens side is connected to an electrical contact terminal 232 provided on the camera body side so as to allow signal transfer to be made between the CPUs 111 and 211 as described later.

A CPU 311 is housed within a strobo unit 300 and has an address code 30 H. The strobo unit 300, while its power switch 312 is on, lights a charge lamp 313 at the time of charge completion so as to provide a flash of light in synchronism with the an exposure of the camera.

A CPU 411 is housed within the control back 400 and has an address code 40 H. The control back 400 includes various operating buttons such as a switch $SW_1$ for setting a film sensitivity, a switch $SW_2$ for setting a shutter speed, a switch $SW_3$ for setting a diaphragm aperture, a switch $SW_4$ for setting a photographing mode, a switch $SW_5$ for setting a focussing mode and a switch $SW_6$ for setting a power zoom mode. In addition, a display member 401 including, for example, a liquid crystal and an LED is provided on the control back 400 so as to display photographing information which is preset by these switches. For example, FIG. 7B shows that the film sensitivity is 100 in ISO, the diaphragm aperture is F5.6, the shutter speed is 1/125 sec. and the focal length of the lens is 35 mm. Further information such as an operated value during a photometry, a date, the number of film frames and lens information is also displayed on the display member 401.

Figure 12:
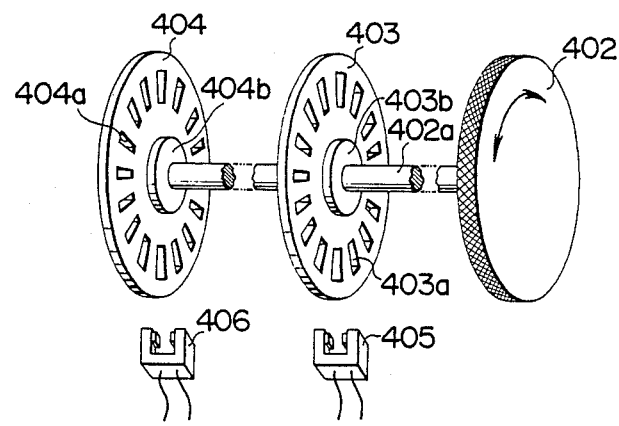
FIG. 12 is an exploded perspective view illustrating a structure of a rotary knob.

A rotary knob 402 is provided on the control back 400. The structure of the rotary knob 402 is shown in FIG. 12. Discs 403, 404 are mounted on a shaft 402a of the rotary knob 402. These discs have a plurality of slits 403a, 404a which are arranged at regular intervals on the periphery thereof, respectively. Photo interrupters 405, 406 are disposed at such positions as to enable them to see through slits 403a, 404a, respectively. The photo interrupters 405, 406, the switches $SW_1$ to $SW_6$ and the display member 401 are connected to the CPU 411 (FIG. 8).

The discs 403, 404 are mounted on shaft 402a through respective one-way clutch plates 403b, 404b which are set respectively in the opposite directions. The photo interrupter 405 or 406 produces pulses indicative of the rotational angle of the rotary knob 402 and the direction of rotation thereof so as to deliver the direction and angle of rotation to CPU 411 by counting these pulses. It should be understood that the rotary knob 402 may be disposed on the circumference of a lens mount of the camera body 100, or on another suitable place on or the lens barrel 200 instead of disposing it on the control back 400. With such a rotary member, information, for example, an ISO sensitivity, an Av exposure correction, a Tv exposure correction, a focusing amount and a quantity of zooming, that intrinsically in vary in an analog, manner, is delivered to an input digital circuit, so that a photographer need only operate the controls by rotating a knob with his intended speed and by his intended rotational angle. Consequently, it is possible to provide the device of the present invention which is easily operable as compared with a conventional input device such as with up and down buttons. Though the disks 403, 404 are formed of a piece of plate, it may be, of course, formed of a plurality of sectors.

In addition, the camera typically includes a remote control box, a system for micro-photography, a focussing rail and the like, the description of which is omitted herein. A system combining the camera body 100, interchangeable lens barrel 200, strobo unit 300 and control back 400 will now be described hereinafter with reference to FIG. 8.

Figure 10:
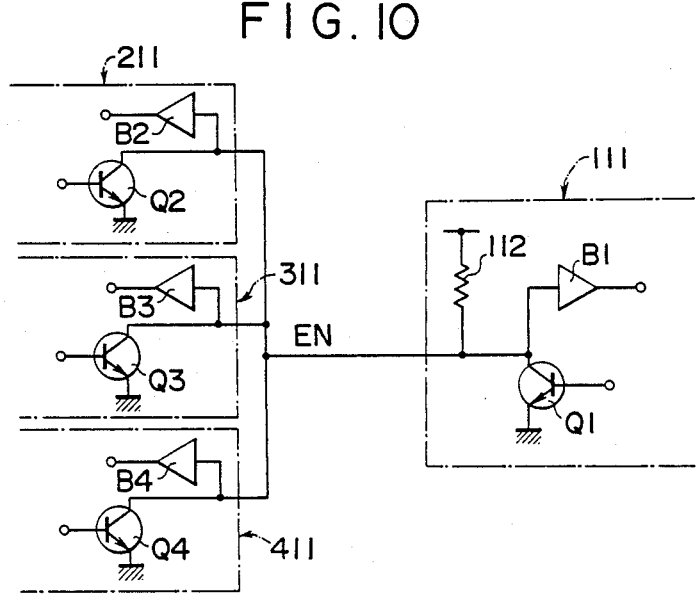
FIG. 10 is a circuit depicting of transistors at output stages of an EN line between CPUs.

The respective CPUs of camera body 100, interchangeable lens barrel 200, strobo unit 300 and control back 400, namely CPSs 111, 211, 311 and 411 are interconnected through five bus lines. The five bus lines include a Vcc line that distributes from a voltage a power source 104 within the camera body or an external power source not shown to each of the CPUs and a CK line supplying a clock signal CK to the CPUs. REQ line designates whether each of the systems delivers or receive data and is activated by pulling the REQ terminal of each of the CPUs to a low logic level "L". An EN line signal designates that each of CPUs is ready to receive data in response to an activation of the REQ signal. Specifically, the EN line is connected to collectors of NPN transistors $Q_1$, $Q_2$, $Q_3$, $Q_4$ whose emitters are grounded as shown in FIG. 10, and which are disposed at output stages of CPUs 111, 211, 311, 411. The collectors are at a high level "H" due to pull up resistor 112 which is provided within CPU 111 when transistors $Q_1$, $Q_2$, $Q_3$, $Q_4$ are off. In addition, the EN line is connected to each of input terminals of buffer amplifiers $B_1$, $B_2$, $B_3$, $B_4$ provided within their respective CPU so as to allow each of CPUs to detect the logic state of the EN line. A DB line is provided for successively transferring data, in a manner that allows the CPUs to read and write the data in synchronism with the clock signal CK. The systems are commonly grounded by being mounted on camera body 100 which serves to provide a body earth (ground).

As described above, the CPUs are connected in parallel by only five common bus lines such that range information and exposure related information can be transferred between the CPUs.

As shown in FIGS. 7A and 8, an attachment lens 250 such as a conversion lens is mounted on the tip end of the lens barrel 200. A CPU 221 is housed within attachment lens 250 and its address code is 21 H and necessary correction of optical data such as focal length information and fully open F value when the attachment lens 250 is mounted on the lens barrel 200 is thus obtained. It should be understood that attachment lens 250 may be an adapter such as a teleconverter which is mounted between the camera body 100 and the lens barrel 200 which serves as a reference lens.

In operation, when the interchangeable lens barrel 200 is mounted on the camera body 100 which is also provided with the control back 400, a voltage is applied from the power source 104 within the camera body 100 through the Vcc line to the CPU 211 within the lens barrel 200 to bring the CPU 211 into on initial condition. The CPU 211 can obtain information of each interchangeable lens according to a program stored in the CPU. One such information is the F number of an interchangeable lens which is not always constant in zoom lenses in general use and which changes with focal length. Accordingly, it is necessary to accommodate a zoom ratio to an F number and such procedure will now be described with reference to FIG. 9.

Whe the zoom ring 213 is rotated, a zoom encoder comprising the slide terminal 224 and the contact piece 223 delivers a high "H" strobe signal to port $PA_0$ of CPU 221 by providing contact between conductor 224$a$ and contact piece 223. While contact piece 223 slides on slide terminal 224 of the gray code pattern with rotation of zoom ring 213, a code signal corresponding to a focal length is delivered to input ports $PO_0$ to $PO_2$ of the CPU 211 in response to contact and non-contact conditions between conductors 224$b$ to 224$d$ ;$l$ of slide terminal 224 and contact piece 223. Assuming that the zoom ring 213 is at a position providing a focal length of 50 mm, as can be seen from FIG. 9, digital signals 0, 1, 0 are impressed onto input ports $PO_0$ to $PO_2$. At this time, it is known that an F number is 3.9 by decoding information stored in ROM (Read-Only Memory) within CPU 211.

Figure 13:
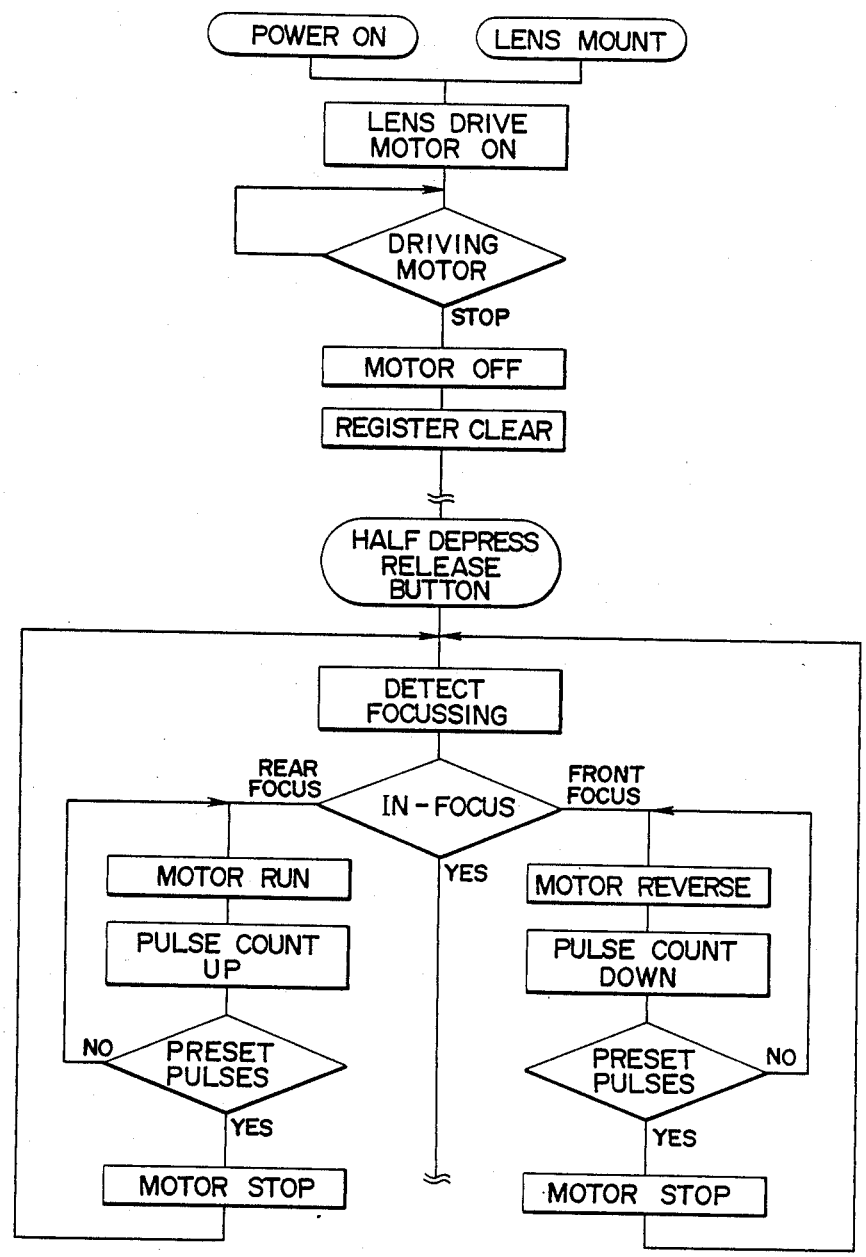
FIG. 13 is a flow chart illustrating operations of the embodiment according to the present invention.

Thereafter, range information is produced, as described by reference to the flow chart of FIG. 13.

First, when a power switch on camera body 100 is turned on or the lens barrel 200 is mounted on a mount of camera body 100, motor 101 within camera body 100 rotates in a given direction and the range ring 201 is rotated to a position at infinity or at close range which is a reference position to stop by abutting against a stopper. Then, comblike electrode 222 stops producing pulses. After a given time, the CPU 211 detects that the range ring 201 has reached the position at infinity and transmits stop supplying signal of motor 101 to main CPU 111 to stop power to motor 101 and to clear the contents of a register of RAM (Random Access Memory) which is housed within the CPU 211 to zero. The system is now in a ready stand by mode.

Subsequently, when a focussing signal is produced as by half-depression of a release button, on the camera body side a focus detection circuit not shown operates to calculate a defocus amount. A value corresponding to the calculated defocus amount is transmitted from the CPU 111 to the CPU 211 and at the same time the CPU 111 drives the lens drive motor 101 in a direction toward an in-focus point.

Then CPU 211 calculates a rotational amount of the range ring 201 required for focussing on the basis of the defocus amount and a present zoom position and continues to count pulses up to the calculated number of pulses from the comblike pattern electrode. At this time, the number of pulses in the register is added or subtracted depending upon a rotational direction of the motor 101 (namely, a front focus or a rear focus). When the calculated number of pulses is reached, the CPU 211 will send a stop signal to the CPU 111 to stop motor 101. As such, when the range ring 201 is set at an in-focus position of the lens, data corresponding to an absolute range is set in the register of CPU 211. The CPU 211 calculates an absolute range on the basis of data in its own register and a zoom position to deliver it to the CPU 111 upon request.

Figure 11:
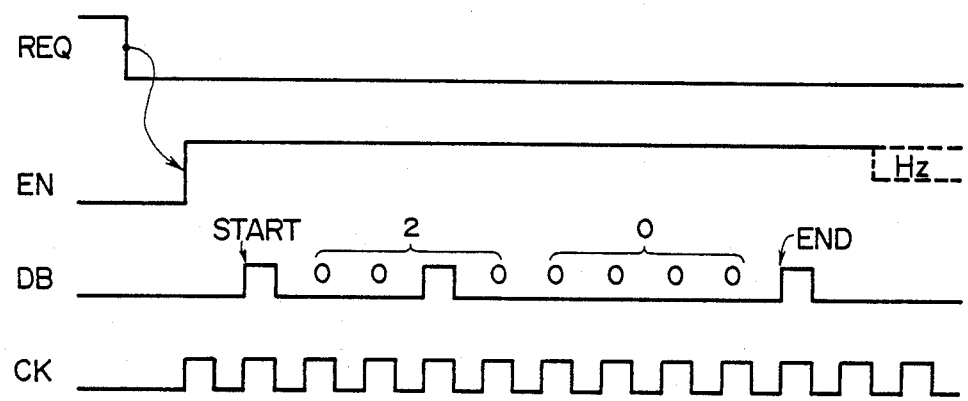
FIG. 11 is a signal waveform diagram of actions of range information in an embodiment according to the present invention.

As already described, the CPUs are interconnected by the bus lines and data is easily transferred between them. A routine for the data transfer is shown in a flow chart of the FIG. 14. When a focusing signal is produced by half-depressing a release button, the CPU 111 sets the REQ terminal to a low level "L", as shown in FIG. 11, in order to receive information necessary for auto-focussing from CPU 211. Then, CPUs 211, 311, 411 in order to give information ready for receiving data to CPU 111, turn off transistors $Q_2$, $Q_3$, $Q_4$ at output stages of the EN terminals of CPUs 211, 311, 411 (see FIG. 10) so that the EN line assumes the high level "H" and thus the CPU 111 recognizes that data are now transferable.

Subsequently, the CPU 111 delivers information of start bit, proper code and stop bit to the DB line in synchronism with a clock signal CK. FIG. 11 shows a state that an address code "20 H" is delivered. In this case, one of the start and end bits may be taken. CPUs 211, 311, 411 decode the address code, and when it is not their own code, wait until the REQ terminal becomes the high level "H". Subsequently, the CPU 111 delivers a pair of data including label and data words. An example of the label is shown in Table 1.

TABLE 1

| Label | Contents | | |
|---|---|---|---|
| | Control back | Lens | Strobo |
| 0 0 | Transmission command | Transmission command | Transmission command |
| 0 1 | Range | Range | Range |
| 0 2 | Zoom ratio | Zoom ratio | Zoom ratio |
| 0 3 | F No. | F No. | — |
| | Actual aperture | | Actual aperture |
| 0 4 | f value | AF information | f value |
| 0 5 | Mode | Lens property | — |
| 0 6 | Shutter speed | Rotary direction | Shutter speed |
| 0 7 | ISO | — | — |
| 0 8 | ± Correction | — | ± Correction |
| 0 9 | Strobo G No. | — | G No. |
| 0 A | Strobo mode | — | Strobo mode |
| 0 B | Timer information | — | . |
| 0 C | Power zoom SW | Power zoom SW | . |
| 0 D | Power focussing SW | Power focussing SW | . . |
| 0 E | Frame No. | . | . |
| 0 F | . | . | . |
| 1 0 | . | . | . |
| 1 1 | . | . | . |
| . | . | . | . |
| . | . | . | . |
| F 9 | . | . | . |
| F A | . | . | . |
| F B | Interruption | Interruption | Interruption |
| | Interruption | Interruption | Interruption |
| F C | complete | complete | complete |
| F D | Date | Date | Date |
| F E | Data-break | Data-break | Data-break |
| F F | Terminator | Terminator | Terminator |

As can be seen from FIG. 11, when the address code 20 H is fed from the CPU 111, CPU 211, which is identified by address code 20 H, will receive the subsequently transmitted label and data. Specifically, when CPU 111 seeks to obtain a zoom ratio and an F number which are necessary for auto-focussing and which are obtainable from lens barrel 200, it successively delivers signals of a transmission command "00H", zoom ratio "02H", F number "03H", break "FEH" and complete "FFH" to the CPU 211 and is on standby with the REQ terminal at high level "H". Similarly, the CPU 211 waits for the EN terminal to become the high level "H" with the REQ terminal at the low level "L". When becoming high level "H", the CPU 211 delivers an address code 10 H, zoom ratio information and F number information to the CPU 111 and terminates this activity when the REQ terminal goes to a high level "H". The CPU 111 calculates a lens driving amount from the data and signals from an auto-focussing element and again delivers the lens driving amount information to the CPU 211 in accordance with the same procedures as described above. Furthermore, the CPU 111 drives the motor 101 and the CPU 211 counts the number of pulses from the comblike electrode 220 of the range ring 201. Comparing the counted number of pulses with the received information of the lens driving amount, the CPU 211 delivers a stop warning signal or a stop signal for the range ring 201 to the CPU 111.

While, in the above embodiment, a focussing operation and calculation of an absolute range are controlled by counting pulses on the range ring 201, the function controlled by counting pulses for rotational angle of the motor of the camera body. In addition, Table 2 shows an example in which an absolute range is calculated by the number of pulses starting from the position at infinity.

TABLE 2

| The number of pulses from the ∞ position | 1 | 2 | 3 | 4 | 5 | 6 | ... | N-3 | N-2 | N-1 |
|---|---|---|---|---|---|---|---|---|---|---|
| Absolute range | ∞ | 20 | 15 | 10 | 9 | 8.2 | ... | | | |

The values shown in Table 2 may be contained within the CPU 211 of the lens barrel 200 for every interchangeable lens. Alternatively, they may be obtained by counting pulses of a rotational angle of the motor within CPU 111. Further, CPU 111 may contain a plurality of typical values (or tables) such that the CPU 211 can deliver information or factors, in certain circumstances, that its interchangeable lens corresponds to which one of the values or tables, to the CPU 111. mechanism, when the rotary knob 402 is rotated after an operating button of a power zoom setting switch SW$_6$ is depressed, information transfer is effected between CPUs as described above and the motor 209 for moving the zoom ring 201 rotates under control of the CPU 211 to achieve a zooming operation. In addition, since the movement of the range ring 201 during focussing is counted by the CPU 211, in such a case that the range ring 201 as in a telephoto lens has a large operational scope so that a torque for the motor 101 is insufficient, another focussing motor is separately provided on the lens barrel side so that an output of the CPU 211 can directly control the motor. At this time, it is to be noted that a stop information for the lens drive motor 101 is fed from the CPU 211 to the CPU 111.

With the control back 400 mounted, when CPU 111 transmits an address code associated with CPU 411 of control back 400 during a display routing. If the CPU 411 answers the answer is recognized. Prior to photographing, the CPU 111 controls actuators by information such as mode information (for example, program-/aperture-priority auto/shutter speed priority auto/-manual photographing/bulb), shutter information and aperture information which is contained within CPU 411. If CPU 411 does not respond, CPU 111 performs the photographic operations in accordance with a prestored program. The control back 401 performs mode presetting, shutter speed presetting and aperture presetting by the CPU 411, a switch which is connected to input and output ports of the CPU 411 and rotational direction information of rotational angle pulses which is given by a rotary knob 402. The preset information are displayed on display member 401 and the exposure information data are delivered to CPU 111, upon request, in the same way as in the lens barrel 200. In addition, when a focussing mode is switched to a manual mode by a focussing mode presetting switch SW$_5$ which is provided on the control back 400, the auto-focussing operation is prohibited and the number and direction of pulses from the rotary knob 402 are delivered to CPU 111 to rotate the motor 101 in response to the rotational direction information, thus enabling a manual focussing.

When a power focus button on the control back 400 is depressed to a power focussing mode, the mode is displayed on display membr 401 and, at the same time, the CPU 411 counts rotational direction and angle of the rotary knob 402 at every given time to deliver them to CPU 111 as information for movement of range ring 201. The CPU 111 performs its operations based on these data and rotates the motor 101 with the resulted output. Simultaneously with this, the CPU 111 detects data for movement of the range ring 201 in the same way as in the auto-focusing, counts the given number of pulses on the range ring 201 and sends back to the CPU 211 as a stop signal for CPU 111.

The CPU 411 also displays the number of frames, ISO in DX cartridge, film feed state and the like in response to information which are sent from CPU 111.

When the strobo unit 300 is mounted on the camera body 100, CPU 111 sequentially issues an address code which is assigned to the strobo unit 300 at a given period in a display routine and, and if the code is answered, recognizes that the strobo unit 300 has been mounted on the camera body and detects the necessity of flash photographing from photographing information to send, for example, a power-on signal if a shutter speed is higher than a time period causing the camera to move by hand. In addition, a total guide number can be given by calculation based on strobo information (for example, charge completion, charge incompletion, guide number and the like) which are included in response data from the strobo unit.

During photographing, a diaphragm value is obtained by a known calculation using range information from the lens barrel 200 and the guide number information which is obtained from the strobo unit 300 to effect a flash control. At this time, an aperture is controlled based on the resulted diaphragm value in the same way as in a normal photographing operation.

In addition, when the strobo unit 300 is the multiple light flash type, bounce information for bounce flash photographing is included in response data, or micro information which a lens is in a microphotographing state is included in lens information, an aperture is set by increasing the opening by a given value than that obtained from the resulted diaphragm value and an exposure is determined by control of a direct photometry.

Figure 14:
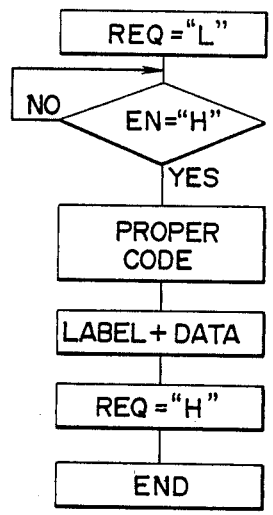
FIG. 14 is a flow chart illustrating data transfer in a data interruption process.
Figure 15:
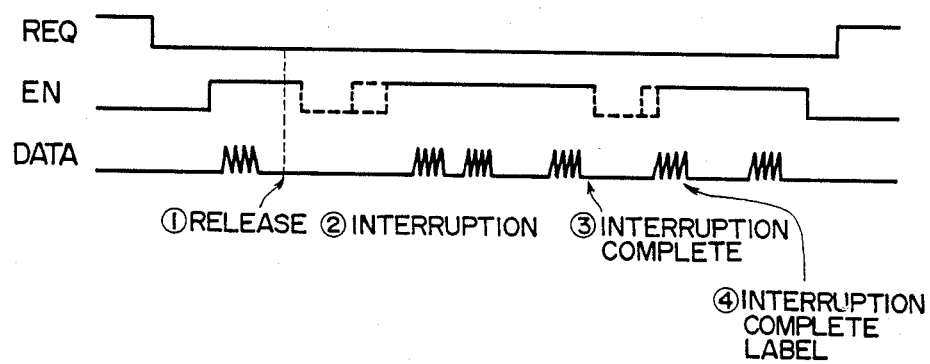
FIG. 15 is a signal waveform diagram explanatory of signal actions in a data interruption process.

As described above, data transfer between a plurality of systems each having a CPU is enabled by connecting bus lines in parallel as shown in FIG. 8 and having a routine for data transfer as shown in a flow chart of FIG. 14. Furthermore, when any other CPU desires to initiate communications with any of the other CPUs it invokes the interrupt line by feeding the REQ signal during data transfer. Then, any one of transistors $Q_1$ to $Q_4$ shown in FIG. 10 is turned on to set the EN terminal a low level "L". Such operation will be described with reference to FIG. 15.

By way of example, let it be assumed that a shutter release is effected while display data are transferred from CPU 11 to CPU 411. (The circled numbers below refer to the tabulation which follows later herein.) ① CPU 111 abandons the data transfer operation currently in progress and turns the transistor $Q_1$ on to set the EN terminal to a low level "L", thereby delivering a signal for interrupting the other CPUs 211, 311, 411. ② CPUs 211, 311, 411 receive the signal at the EN terminal and turn on respective transistors $Q_2$, $Q_3$, $Q_4$. After a given time, CPU 11 turns the transistor $Q_1$ off and stands by until CPUs 211, 311, 411 turn off respective transistors $Q_2$ to $Q_4$ to set the EN line to a high level "H" after their operations in continuation have been completed, followed by assuming the state being capable of receiving the interruption. When the EN line reaches the high level "H", CPU 111 effects the required interruption operation, for example, shutter release, after which CPU 111 renders the REQ line the low level "L", ③ While the EN line is at the high level "H", CPU 111 delivers an interruption complete label to CPUs 211 to 411 in the same way as described above. When receiving the interruption complete label, CPUs 211 to 411 return to their initial conditions. When any other CPU further desires to perform an interruption, it is possible to perform double or triple interruption by setting the EN line to a low level "L" and subsequently sending data with an interruption label.

According to the foregoing, each of CPUs can detect how the overall system of a single lens reflex camera operates by always monitoring the REQ and the EN signals.

In addition, the states of a system are classified into the following four.

| | | |
|---|---|---|
| ① | REQ = 1, EN = 0 | CPU standby |
| ② | REQ = 0, EN = 0 | Any CPU, Transmission command |
| ③ | REQ = 0, EN = 1 | All CPU, Signal receivable, during data transfer |
| ④ | EN = 0 from the above state ③ | Interruption command |

It is to be noted that it is possible to perform data transfer between CPUs, which are connected them in parallel with five bus lines, in response to the above four states.

In view of the foregoing, all combinations of a camera body and any attachments can perform their necessary operations by assigning address codes to each microcomputer to identify each system component in reliance on a data bus construction.

What is claimed is:

1. An output device for developing range information in an interchangeable lens, comprising:
    an interchangeable lens detachably mounted on a camera body and having an objective lens movable in two directions toward or away from said camera body and including a rotatable range ring for moving said objective lens;
    rotation detecting means for producing pulses corresponding to rotation of said range ring of the interchangeable lens;
    extreme position preset means for moving said range ring to an extreme position prior to calculation of range information;
    a first CPU disposed in the interchangeable lens and having data necessary for controlling the focussing of the individual lens of the interchangeable lens as part of a program, for calculating an absolute range value of the interchangeable lens at its focal point on the side of an object being photographed on the basis of the data and the pulses obtained from movement of the range ring from said extreme position; and
    means for outputting said absolute range value to said camera body.

2. An output device according to claim 1, in which said rotation detecting means comprises a comblike electrode of a comblike conductor pattern which is formed on the range ring along its rotational direction, a contact point which is slidably in abutment with said electrode and pulse generating means for producing pulses by turning on and off contact between said first electrode and said contact point in response to rotation of the range ring.

3. An output device according to claim 1, in which said CPU stores said pulses and clears the stored contents whenever the range ring reaches the extreme position.

4. An output device according to claim 1, in which said first CPU is connected to a second CPU disposed within the camera body through bus lines which are capable of selectively transmitting absolute range information to said second CPU which is disposed in the camera body.

5. An output device according to claim 1, in which said first CPU includes data tables for converting a count value obtained from said pulses to an absolute range value representative of a distance to an object on the basis of data stored in said data table.

6. An interchangeable lens detachably mountable to a camera body, the interchangeable lens comprising:
    focus movement detecting means for producing a series of pulses representative of the movement of a range ring of said interchangeable lens, said range ring movable in two directions;
    counter means for providing a pulse count value of said pulses by selectively adding and subtracting said pulses from said pulse count value based on the direction of movement of said range ring;
    detecting means for detecting the arrival of said range ring at an extreme position;
    reset means for resetting said counter means in response to an output produced by said detecting means; and
    calculation means for calculating an absolute range to an object on the basis of said pulse count value.

7. An interchangeable lens according to claim 6, wherein said focus movement detecting means includes a comblike electrode provided on said range ring and a contact point disposed in sliding abutment to said electrode.

8. An interchangeable lens according to claim 6, wherein said calculation means includes data tables which provide data for converting said count value to an absolute range to an object.

9. A camera system, comprising:
    an interchangeable lens, a camera body, and bus lines;
    said interchangeable lens being detachably mounted to said camera body, said lens having a focus position and including focus position detecting means for producing a series of pulses corresponding to movement of said focus position of said interchangeable lens;

detecting means for detecting the arrival of said focus position at an extreme position associated with said interchangeable at lens; and a first CPU for calculating an absolute range value from said pulses on the basis of using said extreme position as a reference;

said camera body including:

a drive motor for moving the focus position of said interchangeable lens;

a second CPU for controlling said drive motor and at least one other camera element of said camera body;

said bus lines interconnecting said first and second CPUs and being effective for permitting information and other signals to be transmitted between said first and second CPUs.

10. A camera system according to claim 9, said interchangeable lens having a range ring and said focus position detector means being effective for detecting rotation of said range ring.

11. A camera system according to claim 9, wherein said bus lines include a clock line for delivering a clock signal, a REQ line for singalling whether a given system is transmitting or receiving data; an EN line for signalling whether a system is ready or is not ready to receive data; and a DB line for transferring said information serially over said DB line.

12. A camera system according to claim 9, further including a respective unique identification code respectively for each of said first and second CPUs.

13. An output device for outputting range information developed in an interchangeable lens, said output device comprising:

an interchangeable lens detachably mountable to a camera body and having a lens which is movable toward or away from said camera body and including a range ring;

rotation detection means for generating a series of pulses representive rotation of said range ring of said interchangeable lens;

counting means for producing a count of said pulses by adding and subtracting said pulses independence on the direction of rotation of said range ring;

initial position setting means for moving a focus position associated with said interchangeable lens to a predetermined position when a power source for said camera system is turned on;

calculation means for calculating an absolute range to an object on the basis of said count value; and means for outputting said absolute range value to said camera body.

14. An output device according to claim 13, further including reset means for resetting said counting means whenever said focus position is at said predetermined position.

15. An output device for outputting range information developed in an interchangeable lens, said output device located in said interchangeable lens and comprising:

focus movement detecting means for producing a series of pulses representative of a focus position associated with said interchangeable lens;

counter means for producing a count of the number of said pulses by adding or subtracting said pulses in dependence on a direction of focussing of said focus position;

reset means for resetting said count of said counter means in response to the detection of the arrival of said focus position at a predetermined position;

data tables for converting said count to an absolute range value; and reading out means for reading out said absolute range value from said data tables.

16. An output device according to claim 15, comprising a plurality of data tables, each data table being respectively dedicated for a given type of an interchangeable lens.

17. An output device according to claim 15, comprising a plurality of data sections, each data table section corresponding to a given type of an interchangeable lens and means for selecting a given one of said data table sections based on the type of interchangeable lens mounted to said camera body.

18. A method for producing absolute range information within an interchangeable lens, said method comprising the steps of:

producing a series of pulses representative of movement of a focus position of an interchangeable lens toward or away from a camera body and producing an indication of the direction of movement of said interchangeable lens;

counting the number of said pulses by adding or subtracting said pulses in dependence on the direction of movement of said focus position;

resetting a count value obtained for said pulses at the detection of the arrival of said focus position to a predetermined position;

calculating an absolute range value to an object on the basis of said count value, said calculating of said absolute range value including reading out an absolute range value from a data table by finding in said data table a corresponding absolute range value for a count value obtained from said counting step; and outputting said absolute range value to a camera body.

19. A camera system, comprising:

rotatable and manually operable operating members disposed on a camera accessory;

pulse generating means for generating pulses in response to rotation of said operation members;

rotation detection means for detecting rotation of said operating members on the basis of said pulses received from said pulse generating means; and a motor drive control circuit for focussing an interchangeable lens in response to an output of said detecting means.

20. A camera system, comprising:

a first CPU for receiving a series of pulses produced in response to movement of a focus position of an interchangeable lens in first and second directions and calculating an absolute range value by respectively adding or subtracting the pulses to or from a count value on the basis of the direction of movement of said interchangeable lens;

a second CPU for controlling camera elements in a camera body;

a third CPU disposed within a camera accessory; and bus lines for interconnecting said first, second and third CPUs, said bus lines being effective for transmitting said absolute range value therethrough.

21. A camera system, comprising:

first CPU for receiving a series of pulses produced by the movement of a focus position of an interchangeable lens which is movable along two directions, said first CPU being further effective for calculating an absolute range by counting said pulses;

a second CPU disposed in a camera body for controlling camera elements of said camera body; and a third CPU disposed in an electronic flash unit for transmitting information characteristic of said electronic flash unit, said information including information indicative of the state of said electronic flash unit and said information being transmitted to said second CPU; said second CPU being effective for determining exposure factors on the basis of said absolute range information delivered by said first CPU and said electronic flash information delivered from said third CPU.

22. A camera system, comprising:

an interchangeable lens and an absolute range detecting means disposed within the interchangeable lens for producing a count value by counting electric pulses produced in response to movement of a focus position of the interchangeable lens with respect to a given position and means for generating an absolute range value from the count value;

outputting means for outputting said absolute range value from said interchangeable lens;

calculation and control means, located outside said interchangeable lens and coupled to said outputting means, for determining an exposure value; and evaluation means for evaluating the status of an electronic flash unit and delivering an electronic flash unit status signal to said calculation and control means, said calculation and control means being effective to determine an exposure value on the basis of said absolute range information and said electronic flash unit status signal.

23. An output device for developing and outputting range information, the output device comprising:

an interchangeable lens barrel detachably mounted on a camera body and variable in focal length and including a rotatable ring;

movement detection means for producing electric pulses corresponding to movement of a lens of said interchangeable lens barrel;

extreme position preset means for moving said lens of said interchangeable lens barrel to an extreme position prior to calculation of range information;

focal length detection means for detecting focal length information in which said interchangeable lens is set;

a first CPU, disposed in said interchangeable lens barrel and having data effective for controlling for focusing of individual lens of said interchangeable lens under control of a program, for calculating an absolute range value of the interchangeable lens at its focal point on the side of an object being photographed on the basis of the data, the focal length information and the electric pulses obtained from movement of the lens from extreme position; and means for outputting said absolute range value to a camera body.

24. An output device according to claim 23, in which said movement detection means comprises a comblike electrode of a comblike conductor pattern which is formed on the rotatable ring along its rotational direction, a contact point disposed in sliding abutment to said electrode and pulse generating means for producing pulses by turning on and off contact between said electrode and said contact point in response to rotation of the rotatable ring.

25. An output device according to claim 23, in which said first CPU stores said pulses and clears the stored contents whenever the lens reaches the extreme position.

26. An output device according to claim 23, in combination with a camera body including a second CPU, said first CPU being connected to said second CPU disposed within said camera body through bus lines which are capable of selectively transmitting absolute range information to said second CPU.

27. An output device according to claim 23, in which said first CPU includes data tables for converting a count value obtained from said pulses to an absolute range value representative of a distance to an object on the basis of data stored in said data tables.

28. An interchangeable lens barrel detachably mountable to a camera body and variable in focal length, the interchangeable lens comprising:

a lens movable in two directions toward or away from the camera body;

focus movement detection means for producing electric pulses corresponding to movement of said lens;

counter means for counting said electric pulses by addition or subtraction according to a direction of movement of said lens;

extreme position detection means for detecting that said lens has reached an extreme position;

reset means for resetting said counter means on the basis of an output of said extreme position detection means;

focal length detection means for detecting focal length setting information of said lens; and calculation means for calculating an absolute range on the basis of a count value of said counter means and said focal length setting information.

29. An interchangeable lens according to claim 28, wherein said focus movement detection means includes a comblike electrode provided on said range ring and a contact point disposed in sliding abutment to said electrode.

30. An interchangeable lens according to claim 28, wherein said calculation means includes data tables containing data for converting said count value to an absolute range to an object.

31. An interchangeable lens barrel according to claim 28, further including means in the interchangeable lens for receiving a demand from a camera body to transmit absolute rang information, and transmitter means, in the interchangeable lens, for transmitting the absolute range information to the camera body responsive to said demand.

32. An interchangeable lens barrel according to claim 31, wherein said focus movement detection means includes a comblike electrode provided on said range ring and a contact point disposed in sliding abutment to said electrode.

33. An interchangeable lens barrel according to claim 31, wherein said calculation means includes data tables containing data for converting said count value to an absolute range to an object.

34. An output device for developing and outputting range information, the output device comprising:

an interchangeable lens barrel detachably mounted on a camera body and variable in focal length and including a rotatable ring;

movement detection means for producing electric pulses corresponding to movement of a lens of said interchangeable lens barrel;

extreme position preset means for moving said lens of said interchangeable lens barrel to an extreme position prior to calculation of range information;

focal length detection means for detecting focal length information in which said interchangeable lens is set;

a first CPU disposed in said interchangeable lens barrel and having data effective for controlling the focusing of individual lens of said interchangeable lens under control of a program, for calculating an absolute range value of the interchangeable lens at its focal point on the side of an object being photographed on the basis of the data, the focal length information and the electric pulses obtained from movement of the lens from said extreme position;

means for outputting said absolute range value to said camera body; and wherein said first CPU is responsive to a second CPU disposed within a camera body to deliver absolute range information in response to a demand from said second CPU.

35. An output device according to claim 34, in which said movement detection means comprises a comblike electrode of a comblike conductor pattern which is formed on the rotatable ring along its rotational direction, a contact point disposed in sliding abutment to said electrode and pulse generating means for producing pulses by turning on and off contact between said electrode and said contact point in response to rotation of the rotatable ring.

36. An output device according to claim 34, in which said first CPU stores said pulses and clears the stored contents whenever the lens reaches the extreme position.

37. An output device according to claim 34, in combination with a camera body and a second CPU disposed in said camera body, said first CPU being connected to said second CPU through bus lines which are capable of selectively transmitting absolute range information to said second CPU.

38. An output device according to claim 34, in which said first CPU includes data tables for converting a count value obtained from said pulses to an absolute range value representative of a distance to an object on the basis of data stored in said data tables.

39. An output device for developing range information, comprising:

a camera body;

an interchangeable lens barrel detachably mounted to said camera body;

focus point status detection means disposed within the camera body for detecting a focus point status of a lens of said interchangeable lens barrel;

drive means for driving said lens in response to an output of said focus point status detection means;

movement detection means for producing electric pulses corresponding to movement of said lens disposed within said interchangeable lens barrel;

extreme position preset means for moving said lens of said interchangeable lens barrel prior to calculation of range information; and a first CPU disposed in the interchangeable lens barrel and having data necessary for controlling the focusing of individual lens under control of a program, for calculating an absolute range value of the interchangeable lens at its focal point on the side of an object being photographed on the basis of the data and the electric pulses obtained from movement of the lens from said extreme position.

40. An output device according to claim 39, including variable focal length means for changing a focal length of the interchangeable lens;

focal length detection means for detecting focal length information which is changed by said variable focal length means; and wherein said first CPU is effective for calculating said absolute range value also on the basis of said focal length information.

41. An output device according to claim 39, further including a bus line for connecting said first CPU to a second CPU disposed within said camera body;

an absolute range information output demand being transmitted from said second CPU to the first CPU when the second CPU receives the demand from the first CPU.

42. An output device for developing range information, comprising:

a camera body;

an interchangeable lens barrel having a lens movable in two directions toward or away from said camera body;

focus point status detection means disposed within said camera body for detecting a focus point status of the lens of said interchangeable lens barrel;

drive means for driving said lens in response to an output of said focus point status detection means;

focus movement detection means for producing electric pulses corresponding to movement of said lens;

counter means for counting said electric pulses by addition or subtraction in response to a direction movement of said lens;

extreme position detection means for detecting that said lens has reached an extreme position;

reset means for resetting said counter means in response to an output of said extreme position detection means;

calculation means for calculating an absolute range on the basis of a count value of said counter means; and said interchangeable lens barrel further includes terminal means for receiving a demand from the camera body to transmit to the camera body absolute range information and transmitter means in the interchangeable lens barrel for transmitting the absolute range information to the camera body in response to said demand.

* * * * *

UNITED STATES PATENT AND TRADEMARK OFFICE
CERTIFICATE OF CORRECTION

PATENT NO. : 4,857,951

DATED : August 15, 1989

INVENTOR(S) : Yukio Nakajima, Tetsuo Miyasaka; Sumio Kawai; and Minoru Hara

It is certified that error appears in the above-identified patent and that said Letters Patent is hereby corrected as shown below:

On face page of patent, delete

"Yukio Nakajima, Kanagawa; Tetsuo Miyasaka; Sumio Kawai, both of Hachioji, all of Japan"

and substitute therefor the following:

--Yukio Nakajima, Kanagawa; Tetsuo Miyasaka; Sumio Kawai; Minoru Hara, all three of Tokyo, all of Japan--.

Signed and Sealed this

Twenty-third Day of October, 1990

Attest:

HARRY F. MANBECK, JR.

*Attesting Officer*     *Commissioner of Patents and Trademarks*